(12) United States Patent
Xu et al.

(10) Patent No.: US 10,785,752 B2
(45) Date of Patent: Sep. 22, 2020

(54) RESOURCE CONFIGURATION METHOD, SYSTEM AND DEVICE FOR SINGLE-CELL MULTICAST CONTROL CHANNEL (SC-MCCH)

(71) Applicant: ZTE Corporation, Shenzhen (CN)

(72) Inventors: Hui Xu, Shenzhen (CN); Zijiang Ma, Shenzhen (CN); Chen Lu, Shenzhen (CN); Yaying Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 109 days.

(21) Appl. No.: 15/752,681

(22) PCT Filed: May 24, 2016

(86) PCT No.: PCT/CN2016/083166
§ 371 (c)(1),
(2) Date: Feb. 14, 2018

(87) PCT Pub. No.: WO2017/028580
PCT Pub. Date: Feb. 23, 2017

(65) Prior Publication Data
US 2018/0249442 A1    Aug. 30, 2018

(30) Foreign Application Priority Data
Aug. 14, 2015    (CN) .......................... 2015 1 0502642

(51) Int. Cl.
*H04W 72/00*    (2009.01)
*H04W 4/06*    (2009.01)
(Continued)

(52) U.S. Cl.
CPC ........... *H04W 72/005* (2013.01); *H04W 4/06* (2013.01); *H04W 48/12* (2013.01);
(Continued)

(58) Field of Classification Search
CPC .... H04L 12/189; H04W 72/005; H04W 4/06; H04W 72/042
(Continued)

(56) References Cited

U.S. PATENT DOCUMENTS

2006/0223544 A1 * 10/2006 Lee ....................... H04W 76/40
455/450
2007/0042794 A1 * 2/2007 Fischer ............... H04W 72/121
455/466
(Continued)

FOREIGN PATENT DOCUMENTS

| CN | 102056342 A | 5/2011 |
| CN | 102264031 A | 11/2011 |

(Continued)

OTHER PUBLICATIONS

3GPP TS 36.331 version 12.6.0 Release 12, 581 pages (Year: 2015).*

(Continued)

*Primary Examiner* — Jae Y Lee
*Assistant Examiner* — Jean F Voltaire
(74) *Attorney, Agent, or Firm* — Cantor Colburn LLP

(57) ABSTRACT

A resource configuration method, system and device for a Single-Cell Multicast Control Channel (SC-MCCH) are provided. In the method, a base station sends a system broadcast message, which includes configuration information of the SC-MCCH configured by the base station, the configuration information includes a Modification Period (MP) of the SC-MCCH and time-domain location information of the SC-MCCH, and the configuration information further includes at least one of: a Repetition Period (RP) of the SC-MCCH, configuration information of SC-MCCH change notification information, and a value tag.

14 Claims, 9 Drawing Sheets

(51) Int. Cl.
*H04W 72/04* (2009.01)
*H04W 48/12* (2009.01)
*H04W 76/28* (2018.01)
*H04L 12/18* (2006.01)

(52) U.S. Cl.
CPC ......... *H04W 72/042* (2013.01); *H04L 12/189* (2013.01); *H04W 76/28* (2018.02)

(58) Field of Classification Search
USPC .......................................................... 370/312
See application file for complete search history.

(56) References Cited

U.S. PATENT DOCUMENTS

| | | | |
|---|---|---|---|
| 2010/0272001 A1* | 10/2010 | Lee ..................... | H04W 72/005 370/312 |
| 2011/0194428 A1* | 8/2011 | Wang .................. | H04W 72/005 370/252 |
| 2015/0078244 A1* | 3/2015 | Lee ........................ | H04W 4/06 370/312 |

FOREIGN PATENT DOCUMENTS

| | | |
|---|---|---|
| CN | 102595331 A | 7/2012 |
| EP | 2903365 A1 | 8/2015 |

OTHER PUBLICATIONS

International Search Report Application No. PCT/CN2016/083166; dated Aug. 5, 2016; pp. 4.
3rd Generation Partnership Project:, Technical Specification Group Radio Access Network, vol. RAN WG2, No. V13.0.0, Jul. 1, 2015, pp. 1-31, XP051294284.
European Search Report for corresponding application EP16836444; Report dated Jun. 19, 2018.
Huawei, et al., "SC-PTM configuration", 3GPP Draft, R2-151407 SC-PTM Configuration, vol. RAN WG2, Apr. 19, 2015, XP050936338.
ZTE, et al., "MCCH Structure for Single Cell PTM transmission", 3GPP Draft, vol. RAN WG2, Feb. 8, 2015, XP050935654.

* cited by examiner

A base station sends a system broadcast message, wherein the system broadcast message contains configuration information of an SC-MCCH configured by the base station, the configuration information includes an MP of the SC-MCCH, time-domain location information of the SC-MCCH and an MCS of the SC-MCCH, and the configuration information further includes at least one of: an RP of the SC-MCCH, configuration information of SC-MCCH change notification information, and a value tag ⸺ S202

Fig. 3

UE receives a system broadcast message sent by a base station, wherein the system broadcast message contains configuration information of an SC-MCCH configured by the base station, the configuration information includes an MP of the SC-MCCH, time-domain location information of the SC-MCCH and an MCS of the SC-MCCH, and the configuration information further includes at least one of: an RP of the SC-MCCH, configuration information of SC-MCCH change notification information, and a value tag ⸺ S302

Fig. 4

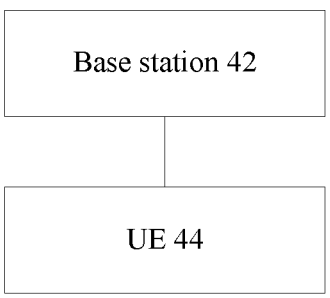

Fig. 5

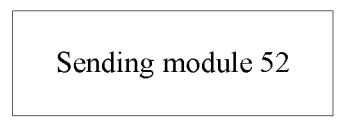

Fig. 6

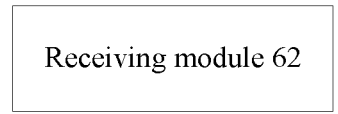

Fig. 7

RESOURCE CONFIGURATION METHOD, SYSTEM AND DEVICE FOR SINGLE-CELL MULTICAST CONTROL CHANNEL (SC-MCCH)

TECHNICAL FIELD

The disclosure relates to the field of communications, and particularly to a resource configuration method, system and device for an SC-MCCH.

BACKGROUND

Along with rapid development of Internet and popularization of large-screen multifunctional mobile phones, a great deal of mobile data multimedia services and various high-bandwidth multimedia services have emerged, such as video conferencing, television broadcasting, video on demand, advertising, online education, interactive games and the like. Multi-service requirements of mobile users are met on one hand, and on the other hand, new service growth points are also brought to mobile operating companies. These mobile data multimedia services may require multiple users to simultaneously receive the same data. Compared with ordinary data services, the mobile data multimedia services have the characteristics such as large data volume, long duration and high time delay sensitivity.

In order to effectively utilize mobile network resources, the 3rd Generation Partnership Project (3GPP) proposes a Multimedia Broadcast/Multicast Service (MBMS). The MBMS is a technology of transmitting data from a data source to multiple target mobile terminals to implement sharing of a network (including a core network and an access network) resource and increase a utilization rate of the network resource (particularly an air interface resource). The MBMS defined by the 3GPP may not only implement pure-text and low-rate message multicast and broadcast but also implement high-speed multimedia service broadcast and multicast to provide various video, audio and multimedia services. The capability of the MBMS undoubtedly follows a tendency of future mobile data development and provides a broader service prospect for development of a 3rd-Generation (3G).

The MBMS has the characteristics that a data volume of the service is large, a reception duration of a mobile terminal is long and an average data rate is constant. These characteristics decide that scheduling and control signaling configuration of the MBMS are both semi-static, that is, scheduling information and control signaling information of the MBMS are both kept unchanged for "a long time". The scheduling information and control signaling information, which may be collectively referred to as MCCH information, of the MBMS may be periodically sent through an MBMS Control Channel (MCCH). Multiple MCCHs may be present in an Evolved MBMS (eMBMS) system. Each MCCH may correspond to different MBMS Single Frequency Network (MBSFN) areas, and only bear MBMS control information sent by the corresponding MBSFN area.

An MBMS notification message may be configured to describe whether MCCH information changes or not. For User Equipment (UE) in an Radio Resource Control (RRC) idle state or an RRC connected mode, whether MCCH information changes or not may be known by monitoring an MBMS notification message, thereby implementing selective reception of the MCCH information, that is, new MCCH information may be received only when the MCCH information changes. Since an information amount of the MBMS notification message is far smaller than the MCCH information, selective reception of the MCCH information by the UE may effectively save resources and reduce power consumption. MCCH notification information may be borne and periodically sent on a Physical Downlink Control Channel (PDCCH) of a specified MBSFN subframe. The specified MBSFN subframe and a sending period of the MCCH notification information may be indicated through a System Information Block 13 (SIB13).

In a Long Term Evolution (LTE) system, for notifying session start of a specified MBMS to UE (or called as a terminal) or initiating a counting request by a network side, Downlink Control Information (DCI) and an MBMS-Radio Network Temporary Identifier (M-RNTI) may be sent on a PDCCH at first. The UE may further read a specific MCCH message according to related information in the DCI. This mechanism is called as an MCCH change notification mechanism. A specific service configuration parameter, for example, a service Identifier (ID), Radio Link Control (RLC) of the service Media Access Control (MAC) and a physical-layer configuration parameter, may be sent on an MCCH.

At present, an MBMS technology is introduced into a Release 9 (R9) LTE system, and is enhanced in Release 10 (R10). In R9, control signaling and user data of an MBMS may be separately transmitted in a Control Plane (CP) and a User Plane (UP) respectively. The CP may control sending of UP data by controlling start, change and end of the service, thereby implement basic MBMS sending. The MBMS may be sent in an MBSFN area with a fixed size (which may be statically or semi-statically configured). In R10, for increasing a resource utilization rate of an MBMS system and facilitating management of an operating company, the MBMS technology is enhanced, mainly including counting and a priority-based preemption mechanism.

The 3GPP proposes a research subject of single-cell MBMS in Release 13 (R13) LTE-Advance (LTE-A). FIG. 1 is a schematic diagram of a single-cell MBMS. A single-cell MBMS may be transmitted on a Physical Downlink Shared Channel (PDSCH).

A PDCCH may serve as indication information for parsing PDSCH data. Therefore, the PDCCH may be sent before the PDSCH (data domain) in the time domain, that is, the PDCCH may occupy the former 1-4 symbols of one subframe. FIG. 2 is a schematic diagram of a channel on which a PDCCH occupies 3 symbols in one subframe. Information transmitted in the PDCCH is called as DCI, which may be used for indicating information such as a resource configuration of the PDSCH and an uplink resource grant. A Cyclic Redundancy Check (CRC) at the tail of the PDCCH occupies 16-bit, and may be scrambled by adopting a specific RNTI. The RNTI may be configured to identify UE or a specific use. The UE may perform blind detection on the PDCCH of the received subframe. In the blind detection, a descrambled bit sequence may be searched by the UE to obtain required control signaling under the condition of no prior information. Blind detection has the advantage of no additional overhead and the shortcoming of relatively high detection complexity. For reducing searching complexity, the concept of search space is defined in TS36.213. Each UE may search a specific search space for control information, and each search space may include a group of Control Channel Elements (CCEs). A search space in LTE includes a common search space and a UE-specific search space.

In a research and practice process, the inventor finds that the related technology has the following problems. Single-cell MBMS scheduling and multi-cell MBMS (MBSFN)

scheduling may be greatly different in that an SC-MCCH is borne and sent on a PDSCH, while an MCCH of an MBSFN area is borne and sent on a Physical Multicast Channel (PMCH). There is yet no method applicable to resource configuration of an SC-MCCH.

For the problem that there is no resource configuration method applicable to an SC-MCCH, there is yet no effective solution.

SUMMARY

Some embodiments of the disclosure provide a resource configuration method, system and device for an SC-MCCH, which may at least solve a problem that there is no resource configuration method applicable to the SC-MCCH.

According to an embodiment of the disclosure, a resource configuration method for an SC-MCCH is provided, which may include the following act. A base station may send a system broadcast message. The system broadcast message may contain configuration information of the SC-MCCH configured by the base station. The configuration information may include a Modification Period (MP) of the SC-MCCH and time-domain location information of the SC-MCCH. The configuration information may further include at least one of: a Repetition Period (RP) of the SC-MCCH, configuration information of SC-MCCH change notification information, and a value tag.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and radio subframe where the SC-MCCH is located. The configuration information of the SC-MCCH change notification information may be used for indicating time-domain location information of the SC-MCCH change notification information, wherein the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. In the embodiment of the disclosure, under a condition that the configuration information includes the value tag, the SC-MCCH change notification information may be indicated by the value tag.

In the embodiment of the disclosure, under a condition that the SC-MCCH change notification information is indicated by the value tag, when a value of the value tag is different from a value of a value tag locally stored by UE, it may be indicated that the SC-MCCH changes; and when the value of the value tag is the same as the value of the value tag locally stored by the UE, it may be indicated that the SC-MCCH does not change.

In the embodiment of the disclosure, under a condition that the SC-MCCH change notification information is indicated by the DCI, when the SC-MCCH change notification information only indicates whether the SC-MCCH changes or not, a first specified bit N in the DCI may be used for indicating whether the SC-MCCH changes or not, wherein a value of N may be 1 or 0, and N being 1 may indicate that the SC-MCCH changes while N being 0 may indicate that the SC-MCCH does not change. In the embodiment of the disclosure, under a condition that the SC-MCCH change notification information is indicated by the DCI, when the SC-MCCH change notification information, besides indicating whether the SC-MCCH changes or not, further indicates a service type of the SC-MCCH, a following indication manner may be adopted. A first specified bit N in the DCI may be used for indicating whether the SC-MCCH changes or not, wherein a value of N may be 1 or 0, and N being 1 may indicate that the SC-MCCH changes while N being 0 may indicate that the SC-MCCH does not change. A second specified bit M in the DCI may be used for indicating a service type of the changed SC-MCCH, wherein a value of M may be 1 or 0, and M being 1 may indicate that a Public Security (PS) service changes while M being 0 may indicate that an ordinary service changes.

In the embodiment of the disclosure, the SC-MCCH may be identified by a first RNTI; and the SC-MCCH change notification information may be identified by a second RNTI.

According to another embodiment of the disclosure, a resource configuration method for an SC-MCCH is provided, which may include the following act. UE may receive a system broadcast message sent by a base station. The system broadcast message may contain configuration information of the SC-MCCH configured by the base station. The configuration information may include an MP of the SC-MCCH and time-domain location information of the SC-MCCH, and the configuration information may further include at least one of: an RP of the SC-MCCH, configuration information of SC-MCCH change notification information, and a value tag.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and/or radio subframe where the SC-MCCH is located. The configuration information of the SC-MCCH change notification information may be used for indicating time-domain location information of the SC-MCCH change notification information, wherein the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. In the embodiment of the disclosure, under a condition that the configuration information includes the value tag, the SC-MCCH change notification information may be indicated by the value tag.

In the embodiment of the disclosure, after the act that the UE receives the system broadcast message sent by the base station, the method may further include the following acts. The UE may determine whether the SC-MCCH changes or not according to the configuration information. Under a condition that the SC-MCCH changes, the UE may read changed SC-MCCH information.

In the embodiment of the disclosure, under a condition that the SC-MCCH change notification information is indicated by the value tag, the act that the UE determines whether the SC-MCCH changes or not according to the configuration information may be implemented in a following manner. The UE may compare a value of the value tag and a value of a value tag locally stored by the UE. Under a condition that the value of the value tag is different from the value of the value tag locally stored by the UE, the UE may determine that the SC-MCCH changes. Under a condition that the value of the value tag is the same as the value of the value tag locally stored by the UE, the UE may determine that the SC-MCCH does not change.

In the embodiment of the disclosure, under a condition that the SC-MCCH change notification information is indicated by the DCI, the act that the UE determines whether the SC-MCCH changes or not according to the configuration information may be implemented in a following manner. The UE may read the configuration information of the SC-MCCH change notification information in the configuration information. The UE may monitor the SC-MCCH change notification information at a location, indicated by the configuration information of the SC-MCCH change notification information, of the subframe where the SC-MCCH is located. The UE may determine whether the SC-MCCH changes or not according to the SC-MCCH change notification information.

In the embodiment of the disclosure, the act that the UE determines whether the SC-MCCH changes or not according to the SC-MCCH change notification information may be implemented in a following manner. The UE may acquire a value of a first specified bit N in the DCI. Under a condition that N is 1, the UE may determine that the SC-MCCH changes. Under a condition that N is 0, the UE may determine that the SC-MCCH does not change, wherein the value of N may be 1 or 0.

In the embodiment of the disclosure, after the act that the UE determines whether the SC-MCCH changes or not according to the configuration information, the method may further include the following acts. The UE may determine whether a service of the SC-MCCH changes or not according to the DCI. Under a condition that the service of the SC-MCCH changes, the UE may receive changed SC-MCCH information.

In the embodiment of the disclosure, the act that the UE determines whether the service of the SC-MCCH changes or not according to the DCI may be implemented in a following manner. The UE may acquire a value of a second specified bit M in the DCI. Under a condition that M is 1, the UE may determine that a PS service of the SC-MCCH changes. Under a condition that M is 0, the UE may determine that an ordinary service of the SC-MCCH changes, wherein the value of M may be 1 or 0.

In the embodiment of the disclosure, the act that the UE reads the changed SC-MCCH information may be implemented in a following manner. The UE may read the changed SC-MCCH information at a start time of a next MP according to the time-domain location information of the SC-MCCH.

According to another embodiment of the disclosure, a resource configuration system for an SC-MCCH is provided, which may include a base station and UE. The base station may be configured to send a system broadcast message to the UE. The system broadcast message may contain configuration information of the SC-MCCH configured by the base station. The configuration information may include an MP of the SC-MCCH and time-domain location information of the SC-MCCH, and the configuration information may further include at least one of: an RP of the SC-MCCH, configuration information of SC-MCCH change notification information, and a value tag.

According to another embodiment of the disclosure, a resource configuration device for an SC-MCCH is provided, which may be applied to a base station and include a sending module. The sending module may be configured to send a system broadcast message. The system broadcast message may contain configuration information of the SC-MCCH configured by the base station. The configuration information may include an MP of the SC-MCCH and time-domain location information of the SC-MCCH, and the configuration information may further include at least one of: an RP of the SC-MCCH, configuration information of SC-MCCH change notification information, and a value tag.

According to another embodiment of the disclosure, a resource configuration device for an SC-MCCH is provided, which may be applied to UE and include a receiving module. The receiving module may be configured to receive a system broadcast message sent by a base station. The system broadcast message may contain configuration information of the SC-MCCH configured by the base station. The configuration information may include an MP of the SC-MCCH and time-domain location information of the SC-MCCH, and the configuration information may further include at least one of: an RP of the SC-MCCH, configuration information of SC-MCCH change notification information, and a value tag.

In the embodiment of the disclosure, the device may further include a determination module and a reading module. The determination module may be configured to determine whether the SC-MCCH changes or not according to the configuration information. The reading module may be configured to, under a condition that the SC-MCCH changes, read changed SC-MCCH information.

In the embodiment of the disclosure, a computer storage medium is further provided, which may store an executable instruction. The executable instruction may be configured to execute the resource configuration method for the SC-MCCH in the abovementioned embodiments.

According to some embodiments of the disclosure, a base station may send a system broadcast message containing configuration information of an SC-MCCH configured by a base station, that is, the base station may configure the configuration information of the SC-MCCH in the system broadcast message. By virtue of the solution in some embodiments of the disclosure, a problem that there is no resource configuration method applicable to the SC-MCCH is solved, and resource configuration of the SC-MCCH is implemented.

BRIEF DESCRIPTION OF THE DRAWINGS

The drawings described here are adopted to provide a deeper understanding to the disclosure, and form a part of the application. Schematic embodiments of the disclosure and descriptions thereof are adopted to explain the disclosure and not intended to form improper limits to the disclosure. In the drawings:

FIG. 3 is a flowchart of a resource configuration method for an SC-MCCH according to an embodiment of the disclosure;

FIG. 4 is a first flowchart of a resource configuration method for an SC-MCCH according to an embodiment of the disclosure;

FIG. 5 is a resource configuration system for an SC-MCCH according to an embodiment of the disclosure;

FIG. 6 is a structure block diagram of a resource configuration device for an SC-MCCH according to an embodiment of the disclosure;

FIG. 7 is a first structure block diagram of a resource configuration device for an SC-MCCH according to an embodiment of the disclosure;

DETAILED DESCRIPTION OF THE EMBODIMENTS

Figure 1:
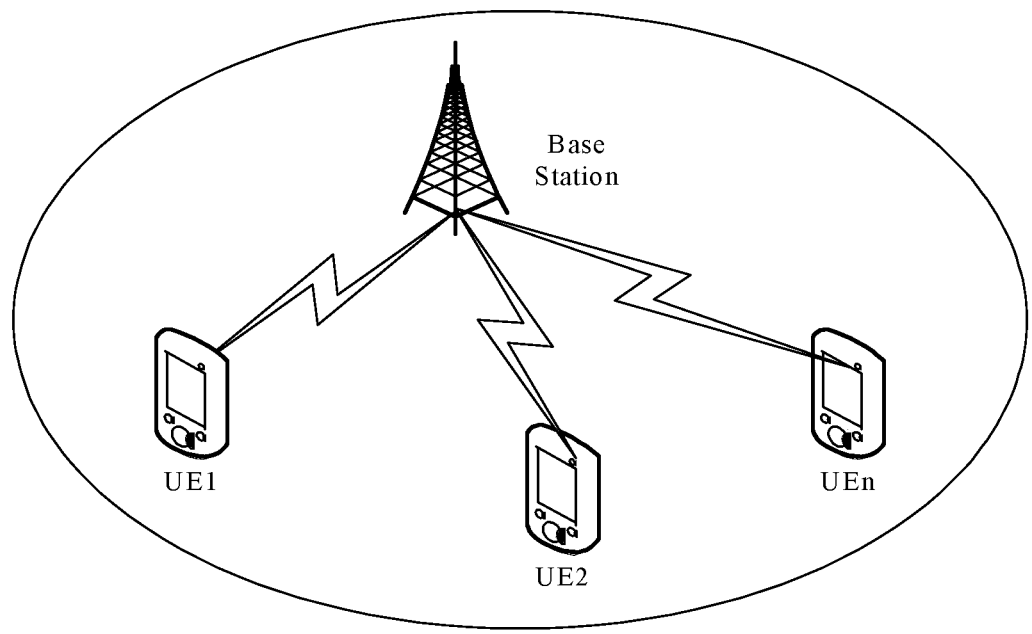
FIG. 1 is a schematic diagram of a single-cell MBMS.
Figure 2:
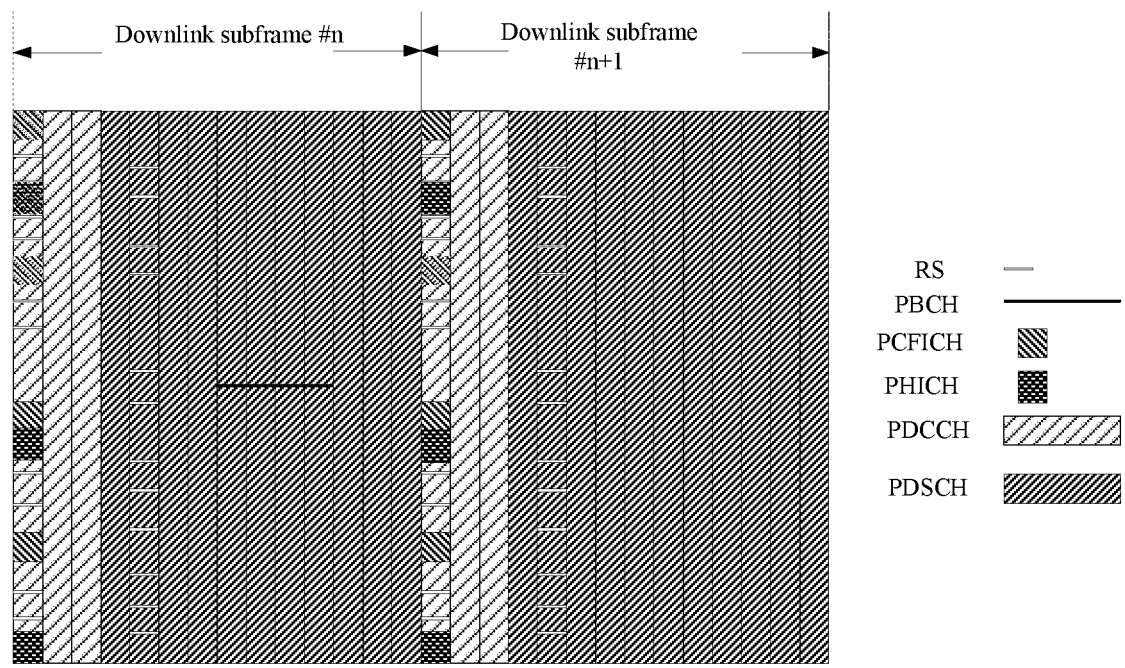
FIG. 2 is a schematic diagram of a channel on which a PDCCH occupies 3 symbols in one subframe.

It is important to note that terms "first", "second" and the like in the specification, claims and drawings of the disclosure may be adopted not to describe a specific sequence or order but to distinguish similar objects.

An embodiment provides a resource configuration method for an SC-MCCH. FIG. 3 is a flowchart of a resource configuration method for an SC-MCCH according to an embodiment of the disclosure. As shown in FIG. 3, the flow may include the following act.

At act S202, a base station may send a system broadcast message. The system broadcast message may contain configuration information of the SC-MCCH configured by the base station. The configuration information includes an MP of the SC-MCCH, time-domain location information of the SC-MCCH and a Modulation and Coding Scheme (MCS) of the SC-MCCH, and the configuration information may further include at least one of: an RP of the SC-MCCH, configuration information of SC-MCCH change notification information, and a value tag.

By the act, the base station may send the system broadcast message containing the configuration information of the SC-MCCH configured by the base station, that is, the base station may configure the configuration information of the SC-MCCH in the system broadcast message. By virtue of the solution, a problem that there is no resource configuration method applicable to the SC-MCCH is solved, and resource configuration of the SC-MCCH is implemented.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and radio subframe where the SC-MCCH is located. The MCS may be an MCS of the radio subframe where the SC-MCCH is located. The configuration information of the SC-MCCH change notification information may be used for indicating time-domain location information of the SC-MCCH change notification information. Herein, the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. Under a condition that the configuration information includes the value tag, the SC-MCCH change notification information may be indicated by the value tag.

In the embodiment of the disclosure, under a condition that the SC-MCCH change notification information is indicated by the value tag, when a value of the value tag is different from a value of a value tag locally stored by UE, it may be indicated that the SC-MCCH changes; and when the value of the value tag is the same as the value of the value tag locally stored by the UE, it may be indicated that the SC-MCCH does not change.

In the embodiment of the disclosure, under a condition that the SC-MCCH change notification information is indicated by the DCI, when the SC-MCCH change notification information only indicates whether the SC-MCCH changes or not, a first specified bit N in the DCI may be used for indicating whether the SC-MCCH changes or not, wherein a value of N may be 1 or 0, and N being 1 may indicate that the SC-MCCH changes while N being 0 may indicate that the SC-MCCH does not change. In the embodiment of the disclosure, under a condition that the SC-MCCH change notification information is indicated by the DCI, when the SC-MCCH change notification information, besides indicating whether the SC-MCCH changes or not, further indicates a service type of the SC-MCCH, a first specified bit N in the DCI may be used for indicating whether the SC-MCCH changes or not, wherein a value of N may be 1 or 0, and N being 1 may indicate that the SC-MCCH changes while N being 0 may indicate that the SC-MCCH does not change, and a second specified bit M in the DCI may be used for indicating a service type of the changed SC-MCCH, wherein a value of M may be 1 or 0, and M being 1 may indicate that a PS service changes while M being 0 may indicate that an ordinary service changes.

In the embodiment of the disclosure, the SC-MCCH may be identified by a first RNTI; and the SC-MCCH change notification information may be identified by a second RNTI.

An embodiment provides a resource configuration method for an SC-MCCH. FIG. 4 is a first flowchart of a resource configuration method for an SC-MCCH according to an embodiment of the disclosure. As shown in FIG. 4, the flow may include the following act.

At act S302, UE may receive a system broadcast message sent by a base station. The system broadcast message may contain configuration information of the SC-MCCH configured by the base station. The configuration information may include an MP of the SC-MCCH, time-domain location information of the SC-MCCH and an MCS of the SC-MCCH, and the configuration information may further include at least one of: an RP of the SC-MCCH, configuration information of SC-MCCH change notification information, and a value tag.

By the act, the UE may receive the system broadcast message sent by the base station. The system broadcast message may contain the configuration information of the SC-MCCH configured by the base station, that is, the base station may configure the configuration information of the SC-MCCH in the system broadcast message. By virtue of the solution, a problem that there is no resource configuration method applicable to the SC-MCCH is solved, and resource configuration of the SC-MCCH is implemented.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and/or radio subframe where the SC-MCCH is located. The MCS may be an MCS of the radio subframe where the SC-MCCH is located. The configuration information of the SC-MCCH change notification information may be used for indicating time-domain location information of the SC-MCCH change notification information. Herein, the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. Under a condition that the configuration information includes the value tag, the SC-MCCH change notification information may be indicated by the value tag.

In the embodiment of the disclosure, after the act that the UE receives the system broadcast message sent by the base station, the method may further include the following acts. The UE may determine whether the SC-MCCH changes or not according to the configuration information. Under a condition that the SC-MCCH changes, the UE may read changed SC-MCCH information.

In the embodiment of the disclosure, under a condition that the SC-MCCH change notification information is indicated by the value tag, the act that the UE determines whether the SC-MCCH changes or not according to the configuration information may be implemented in the following manner. The UE may compare a value of the value tag and a value of a value tag locally stored by the UE. Under a condition that the value of the value tag is different from the value of the value tag locally stored by the UE, the UE may determine that the SC-MCCH changes. Under a condition that the value of the value tag is the same as the value of the value tag locally stored by the UE, the UE may determine that the SC-MCCH does not change.

In the embodiment of the disclosure, under a condition that the SC-MCCH change notification information is indicated by the DCI, the act that the UE determines whether the SC-MCCH changes or not according to the configuration information may be implemented in the following manner. The UE may read the configuration information of the SC-MCCH change notification information in the configuration information. The UE may monitor the SC-MCCH change notification information at a location, indicated by the configuration information of the SC-MCCH change notification information, of the subframe where the SC-MCCH is located. The UE may determine whether the SC-MCCH changes or not according to the SC-MCCH change notification information.

The term monitoring in the embodiment of the disclosure may refer to a following process. The UE may perform a mask operation by adopting an SM-RNTI and a CRC of a subframe of an SC-MCCH change notification message, and check the CRC. In case of successful checking, the UE may determine that the subframe is a required subframe, and further read a content of the DCI in the PDCCH of the subframe, the content of the DCI being the SC-MCCH change notification message.

In the embodiment of the disclosure, the act that the UE determines whether the SC-MCCH changes or not according to the SC-MCCH change notification information may be implemented in the following manner. The UE may acquire a value of a first specified bit N in the DCI, where the value of N may be 1 or 0. Under a condition that N is 1, the UE may determine that the SC-MCCH changes. Under a condition that N is 0, the UE may determine that the SC-MCCH does not change.

In the embodiment of the disclosure, after the act that the UE determines whether the SC-MCCH changes or not according to the configuration information, the method may further include the following acts. The UE may determine whether a service of the SC-MCCH changes or not according to the DCI. Under a condition that the service of the SC-MCCH changes, the UE may receive changed SC-MCCH information.

In the embodiment of the disclosure, the act that the UE determines whether the service of the SC-MCCH changes or not according to the DCI may be implemented in the following manner. The UE may acquire a value of a second specified bit M in the DCI, where the value of M may be 1 or 0. Under a condition that M is 1, the UE may determine that a PS service of the SC-MCCH changes. Under a condition that M is 0, the UE may determine that an ordinary service of the SC-MCCH changes.

In the embodiment of the disclosure, the act that the UE reads the changed SC-MCCH information may be implemented in the following manner. The UE may read the changed SC-MCCH information at a start time of a next MP according to the time-domain location information of the SC-MCCH.

From the above descriptions about implementation modes, those skilled in the art may clearly know about that the method according to the abovementioned embodiments may be implemented in a manner of combining software and a universal hardware platform, and of course, may also be implemented through hardware. However, the former is an exemplary implementation mode under many circumstances. Based on such an understanding, the technical solutions of the disclosure substantially or partially making contributions to a conventional art may be embodied in form of software product. The computer software product may be stored in a storage medium (for example, a Read-Only Memory (ROM)/Random Access Memory (RAM), a magnetic disk and an optical disk), including a plurality of instructions configured to enable terminal equipment (which may be a mobile phone, a computer, a server, network equipment or the like) to execute the method of each embodiment of the disclosure.

An embodiment provides a resource configuration system for an SC-MCCH. FIG. 5 is a resource configuration system for an SC-MCCH according to an embodiment of the disclosure. As shown in FIG. 5, the system may include a base station 42 and UE 44.

The base station 42 may be configured to send a system broadcast message to the UE. The system broadcast message may contain configuration information of the SC-MCCH configured by the base station. The configuration information may include an MP of the SC-MCCH and time-domain location information of the SC-MCCH, and the configuration information may further include at least one of: an RP of the SC-MCCH, configuration information of SC-MCCH change notification information, and a value tag.

The UE 44 may be configured to receive the system broadcast message sent by the base station 42, determine whether the SC-MCCH changes or not according to the configuration information, and under a condition that the SC-MCCH changes, read changed SC-MCCH information.

By the system, the base station may send the system broadcast message containing the configuration information of the SC-MCCH configured by the base station, that is, the base station may configure the configuration information of the SC-MCCH in the system broadcast message, and then the base station may send the system broadcast message containing the configuration information to the UE. By virtue of the solution, a problem that there is no resource configuration method applicable to the SC-MCCH is solved, and resource configuration of the SC-MCCH is implemented.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and radio subframe where the SC-MCCH is located. The MCS may be an MCS of the radio subframe where the SC-MCCH is located. The configuration information of the SC-MCCH change notification information may be used for indicating time-domain location information of the SC-MCCH change notification information, and the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. Under a condition that the configuration information includes the value tag, the SC-MCCH change notification information may be indicated by the value tag.

In the embodiment of the disclosure, under a condition that the SC-MCCH change notification information is indicated by the value tag, when a value of the value tag is different from a value of a value tag locally stored by UE, it may be indicated that the SC-MCCH changes; and when the value of the value tag is the same as the value of the value tag locally stored by the UE, it may be indicated that the SC-MCCH does not change.

In the embodiment of the disclosure, under a condition that the SC-MCCH change notification information is indicated by the DCI, when the SC-MCCH change notification information only indicates whether the SC-MCCH changes or not, a first specified bit N in the DCI may be used for indicating whether the SC-MCCH changes or not, wherein a value of N is 1 or 0, and N being 1 may indicate that the SC-MCCH changes while N being 0 may indicate that the SC-MCCH does not change. In the embodiment of the disclosure, under a condition that the SC-MCCH change notification information is indicated by the DCI, when the SC-MCCH change notification information, besides indicating whether the SC-MCCH changes or not, further indicates a service type of the SC-MCCH, a first specified bit N in the DCI may be used for indicating whether the SC-MCCH changes or not, wherein a value of N is 1 or 0, and N being 1 may indicate that the SC-MCCH changes while N being 0 may indicate that the SC-MCCH does not change, and a second specified bit M in the DCI may be used for indicating a service type of the changed SC-MCCH, wherein a value of M is 1 or 0, and M being 1 may indicate that a PS service changes while M being 0 may indicate that an ordinary service changes.

In the embodiment of the disclosure, the SC-MCCH may be identified by a first RNTI; and the SC-MCCH change notification information may be identified by a second RNTI.

In the embodiment of the disclosure, the base station 42 may be further configured to send an SC-MCCH message and Single-Cell Multicast Traffic Channel (SC-MTCH) service data, and scramble CRCs of the subframe of the SC-MCCH change notification information and the subframe of the SC-MCCH by adopting an SM-RNTI and an SC-MCCH RNTI.

Another embodiment provides a resource configuration device for an SC-MCCH. The device may be configured to implement the abovementioned embodiments and exemplary implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

FIG. 6 is a structure block diagram of a resource configuration device for an SC-MCCH according to an embodiment of the disclosure. As shown in FIG. 6, the device is applied to a base station, and the device may include a sending module 52.

The sending module 52 may be configured to send a system broadcast message. The system broadcast message may contain configuration information of the SC-MCCH configured by the base station. The configuration information may include an MP of the SC-MCCH and time-domain location information of the SC-MCCH, and the configuration information may further include at least one of: an RP of the SC-MCCH, configuration information of SC-MCCH change notification information, and a value tag.

By the device, the sending module 52 in the base station may send the system broadcast message containing the configuration information of the SC-MCCH configured by the base station, that is, the base station may configure the configuration information of the SC-MCCH in the system broadcast message. By virtue of the solution, a problem that there is no resource configuration method applicable to the SC-MCCH is solved, and resource configuration of the SC-MCCH is implemented.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and radio subframe where the SC-MCCH is located. The MCS may be an MCS of the radio subframe where the SC-MCCH is located. The configuration information of the SC-MCCH change notification information may be used for indicating time-domain location information of the SC-MCCH change notification information, and the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. Under a condition that the configuration information includes the value tag, the SC-MCCH change notification information may be indicated by the value tag.

In the embodiment of the disclosure, under a condition that the SC-MCCH change notification information is indicated by the value tag, when a value of the value tag is different from a value of a value tag locally stored by UE, it may be indicated that the SC-MCCH changes; and when the value of the value tag is the same as the value of the value tag locally stored by the UE, it may be indicated that the SC-MCCH does not change.

In the embodiment of the disclosure, under a condition that the SC-MCCH change notification information is indicated by the DCI, when the SC-MCCH change notification information only indicates whether the SC-MCCH changes or not, a first specified bit N in the DCI may be used for indicating whether the SC-MCCH changes or not, wherein a value of N is 1 or 0, and N being 1 may indicate that the SC-MCCH changes while N being 0 may indicate that the SC-MCCH does not change. In the embodiment of the disclosure, under a condition that the SC-MCCH change notification information is indicated by the DCI, when the SC-MCCH change notification information, besides indicating whether the SC-MCCH changes or not, further indicates a service type of the SC-MCCH, a first specified bit N in the DCI may be used for indicating whether the SC-MCCH changes or not, wherein a value of N is 1 or 0, and N being 1 may indicate that the SC-MCCH changes while N being 0 may indicate that the SC-MCCH does not change, and a second specified bit M in the DCI may be used for indicating a service type of the changed SC-MCCH, wherein a value of M is 1 or 0, and M being 1 may indicate that a PS service changes while M being 0 may indicate that an ordinary service changes.

In the embodiment of the disclosure, the SC-MCCH may be identified by a first RNTI; and the SC-MCCH change notification information may be identified by a second RNTI.

Still another embodiment provides a resource configuration device for an SC-MCCH. FIG. 7 is a first structure block diagram of a resource configuration device for an SC-MCCH according to an embodiment of the disclosure. As shown in FIG. 7, the device is applied to UE, and the device may include a receiving module 62.

The receiving module 62 may be configured to receive a system broadcast message sent by a base station. The system broadcast message may contain configuration information of the SC-MCCH configured by the base station. The configuration information may include an MP of the SC-MCCH, time-domain location information of the SC-MCCH and an MCS of the SC-MCCH, and the configuration information may further include at least one of: an RP of the SC-MCCH, configuration information of SC-MCCH change notification information, and a value tag.

By the act, the base station may send the system broadcast message containing the configuration information of the SC-MCCH configured by the base station, that is, the base station may configure the configuration information of the SC-MCCH in the system broadcast message. By virtue of the solution, a problem that there is no resource configuration method applicable to the SC-MCCH is solved, and resource configuration of the SC-MCCH is implemented.

In the embodiment of the disclosure, the MP may be used for indicating a period of modification of the SC-MCCH. The RP may be used for indicating a period of repeated sending of the SC-MCCH in one MP. The time-domain location information of the SC-MCCH may be used for indicating locations of a radio frame and/or radio subframe where the SC-MCCH is located. The MCS may be an MCS of the radio subframe where the SC-MCCH is located. The configuration information of the SC-MCCH change notification information may be used for indicating time-domain location information of the SC-MCCH change notification information, and the time-domain location information of the SC-MCCH change notification information may include: locations of a radio frame and radio subframe where the SC-MCCH change notification information is located. The value tag may be used for indicating the SC-MCCH change notification information.

In the embodiment of the disclosure, under a condition that the configuration information includes the configuration information of the SC-MCCH change notification information, the SC-MCCH change notification information may be indicated by DCI in a PDCCH. Under a condition that the configuration information includes the value tag, the SC-MCCH change notification information may be indicated by the value tag.

Figure 8:
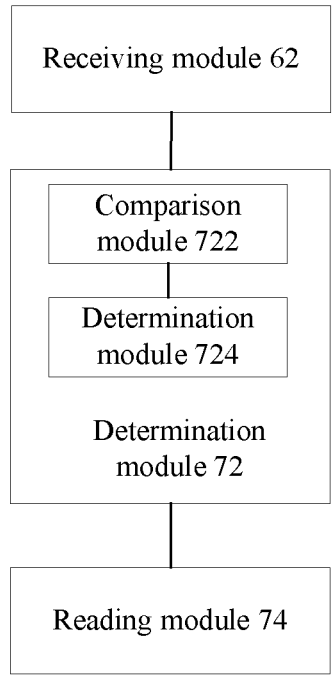
FIG. 8 is a second structure block diagram of a resource configuration device for an SC-MCCH according to an embodiment of the disclosure.

FIG. 8 is a second structure block diagram of a resource configuration device for an SC-MCCH according to an embodiment of the disclosure. In the embodiment of the disclosure, the device may further include a determination module 72 and a reading module 74. The determination module 72 may be configured to determine whether the SC-MCCH changes or not according to the configuration information. The reading module 74 may be configured to, under a condition that the SC-MCCH changes, read changed SC-MCCH information.

In the embodiment of the disclosure, under a condition that the SC-MCCH change notification information is indicated by the value tag, the determination module 72 may include a comparison module 722 and a determination module 724. The comparison module 722 may be configured to compare a value of the value tag and a value of a value tag locally stored by the UE. The determination module 724 may be configured to, under a condition that the value of the value tag is different from the value of the value tag locally stored by the UE, determine that the SC-MCCH changes, and under a condition that the value of the value tag is the same as the value of the value tag locally stored by the UE, determine that the SC-MCCH does not change.

In the embodiment of the disclosure, under a condition that the SC-MCCH change notification information is indicated by the DCI, the determination module 72 may be further configured to read the configuration information of the SC-MCCH change notification information in the configuration information, monitor the SC-MCCH change notification information at a location, indicated by the configuration information of the SC-MCCH change notification information, of the subframe where the SC-MCCH is located, and determine whether the SC-MCCH changes or not according to the SC-MCCH change notification information.

Figure 9:
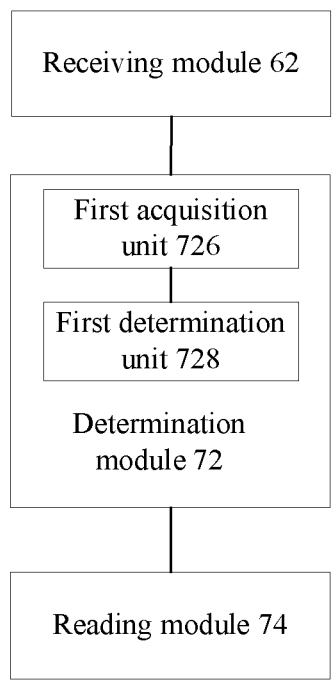
FIG. 9 is a third structure block diagram of a resource configuration device for an SC-MCCH according to an embodiment of the disclosure.

FIG. 9 is a third structure block diagram of a resource configuration device for an SC-MCCH according to an embodiment of the disclosure. As shown in FIG. 9, in the embodiment of the disclosure, the determination module 72 may include a first acquisition unit 726 and a first determination unit 728. The first acquisition unit 726 may be configured to acquire a value of a first specified bit N in the DCI. The first determination unit 728 may be configured to, under a condition that N is 1, determine that the SC-MCCH changes, and under a condition that N is 0, determine that the SC-MCCH does not change, wherein the value of N is 1 or 0.

The determination module 72 may be further configured to determine whether a service of the SC-MCCH changes or not according to the DCI, and under a condition that the service of the SC-MCCH changes, receive changed SC-MCCH information.

The first acquisition unit 726 may further acquire a value of a second specified bit M in the DCI. The first determination unit 728 may determine, under a condition that M is 1, that a PS service of the SC-MCCH changes, and determine, under a condition that M is 0, that an ordinary service of the SC-MCCH changes, wherein the value of M may be 1 or 0.

The reading module 74 may be further configured to read the changed SC-MCCH information at a start time of a next MP according to the time-domain location information of the SC-MCCH.

Each module may be implemented through software or hardware, and the latter condition may be implemented in, but not limited to the following manners. The modules may all be located in the same processor, or, the modules may be located in multiple processors respectively.

For better understanding the disclosure, the disclosure may further be explained below in combination with an exemplary embodiment.

The exemplary embodiment provides a configuration method for an SC-MCCH, which may include the following act. Configuration information of the SC-MCCH may be indicated on a Single Cell-Point to Multi-point (SC-PTM) cell broadcast message. The configuration information may include an MP of the SC-MCCH, time-domain location information of the SC-MCCH and an MCS of the SC-MCCH, and the configuration information may further include at least one of an RP of the SC-MCCH, configuration information of SC-MCCH change notification information, and a value tag.

Figure 10:
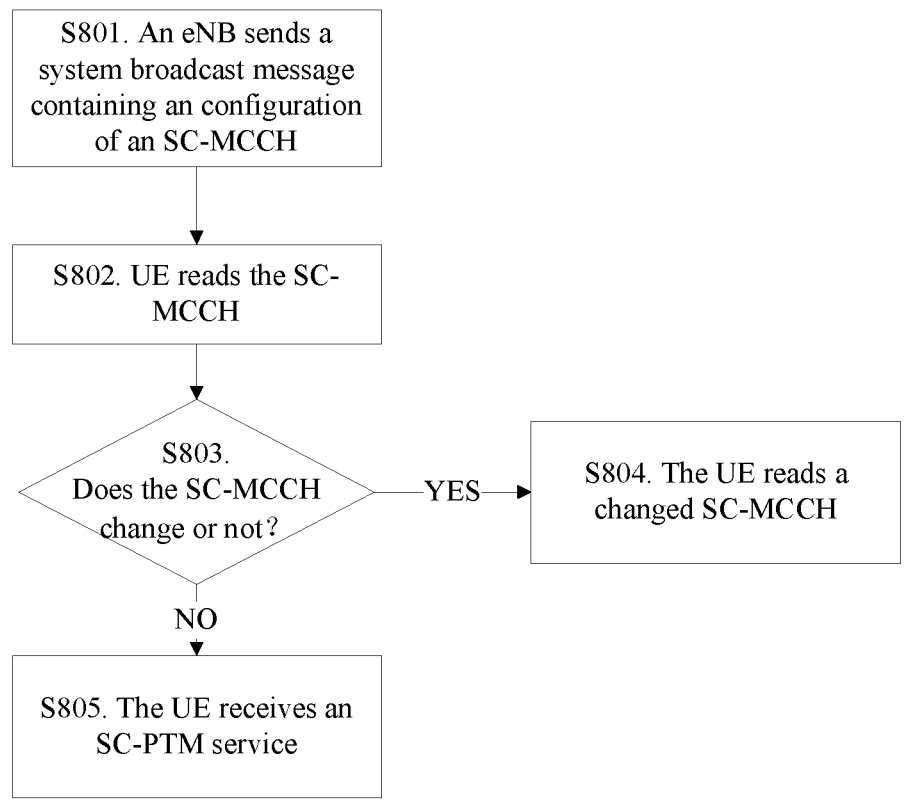
FIG. 10 is a flowchart of a configuration method for an SC-MCCH according to an exemplary embodiment of the disclosure.

FIG. 10 is a flowchart of a configuration method for an SC-MCCH according to an exemplary embodiment of the disclosure. As shown in FIG. 10, the method may include the following acts.

At act 801, a base station, e.g., an evolved Node B (eNB), may send a system broadcast message containing configuration information of an SC-MCCH.

The eNB may refer to an eNB where a cell sending an SC-PTM service is located. The SC-MCCH is a single-cell multicast control channel, and the SC-MCCH may be used for indicating related configuration information of an SC-MTCH. The configuration information may be related configuration information of the SC-MCCH. The configuration information may include an MP of the SC-MCCH, time-domain location information of the SC-MCCH and an MCS of the SC-MCCH, and may further include at least one of: an RP of the SC-MCCH, configuration information of SC-MCCH change notification information, and a value tag.

The MP may indicate a period where the SC-MCCH may be modified, and the MP may be one of {320 ms, 640 ms, 1,280 ms, 2,560 ms, 5,120 ms, 10,240 ms}. The RP may indicate a period of repeated sending of the SC-MCCH in one MP, and the RP may be one of {160 ms, 320 ms, 640 ms, 1,280 ms, 2,560 ms}. A time-domain location of the SC-MCCH may include radio frame and radio subframe configuration information of the SC-MCCH, i.e. a radio frame and radio subframe where the SC-MCCH is located. In the embodiment, the subframe may be a unicast subframe. The MCS of the SC-MCCH may be an MCS of the subframe where the SC-MCCH is located, and may be indicated by an index number corresponding to the MCS.

The MP and the RP may adopt smaller numerical values according to a requirement, but the following condition is suggested to be met. The MP is suggested to be larger than a value of the RP.

The SC-MCCH change notification information may be indicated by any one of the following methods: 1) a value tag; and 2) DCI in a PDCCH.

If the value tag is adopted for indication, an integer field sc-mcchValueTag may be set in the system broadcast message indicating a configuration of the SC-MCCH, a value of the field being (0 . . . 31). Every time when the SC-MCCH changes, the eNB may set a new sc-mcchValueTag=original sc-mcchValueTag+1, the UE may store a value of the sc-mcchValueTag every time when the UE reads the configuration information of the SC-MCCH. If the UE finds that a value of sc-mcchValueTag in a current system broadcast message is different from the locally stored value of the sc-mcchValueTag, it is indicated that the SC-MCCH changes, otherwise it is indicated that the SC-MCCH does not change.

If the DCI is adopted for indication, a specific RNTI, for example, SM-RNTI=FFFC, may be allocated to the SC-MCCH change notification information at first. Considering that the SC-MCCH is transmitted through a PDSCH and is scheduled through the PDCCH on a frequency domain, it is suggested to pre-allocate an RNTI, for example, SC-MCCH RNTI=FFFB, to the SC-MCCH, which may alternatively be SM-RNTI=FFFB and SC-MCCH RNTI=FFFC. The time-domain location information, for example, a time-domain frame location and a subframe index, for sending of the SC-MCCH change notification information and a notification information repetition frequency in one MP of the SC-MCCH may be indicated in the configuration information of the SC-MCCH change notification information on the system broadcast system.

Specifically, when an SC-MCCH change notification information is borne on the DCI in the PDCCH of the time-domain subframe, DCI format-1c may be adopted. If the notification message only indicates whether the SC-MCCH changes or not, a bit N in the DCI may be adopted for indication, it is indicated that the SC-MCCH will change in a next MP of the SC-MCCH if N=1, and it is indicated that the SC-MCCH does not change if N=0. A service type may be indicated in the DCI, for example, two bits N may be adopted for indication, wherein N1 indicates whether the SC-MCCH changes or not, and N2 indicates a changing service type. For example, N2=1 may indicate that a PS service changes, and N2=0 may indicate that an ordinary service changes. Optionally, more than two bits in the DCI may be adopted to indicate more change information.

The system broadcast message may be an existing system broadcast message, for example, an SIB13 or an SIB15, or a newly created system broadcast message dedicated to an SC-PTM. If the system broadcast message is the SIB13, the related configuration information of the SC-MCCH may be added on the basis of a conventional of the existing SIB13.

At act 802, UE may receive SC-MCCH information.

The UE may monitor and receive required SC-MCCH information at a corresponding location according to an indication of the configuration information of the SC-MCCH in the system broadcast message. The UE may read the SC-MCCH information after startup or cell reselection/handover to a new cell, and may also monitor the SC-MCCH change notification information according to the configuration information of the SC-MCCH change notification information.

Frequency-domain scheduling information of the SC-MCCH may be sent through the PDCCH of the corresponding subframe, and specifically, may be sent through the DCI in the PDCCH.

The DCI may at least include: scheduling information of the SC-MCCH on the frequency domain. The UE may detect the subframe, indicated in the system message, of the SC-MCCH by adopting the pre-allocated SC-MCCH RNTI, and in case of successful detection, it may represent that the subframe includes the required SC-MCCH information.

The UE in the embodiment has an MBMS receiving capability, and may be interested in receiving an MBMS. The UE may be in an RRC-connected mode or an RRC-idle mode.

At act 803, the UE may determine whether the SC-MCCH changes or not, if YES, act 804 is executed, otherwise act 805 is executed.

The UE may detect the PDCCH at the subframe location, indicated in the system broadcast message, of the SC-MCCH change notification information. The detection may be implemented in the following manner. A mask operation may be performed on a CRC of the subframe by adopting the SM-RNTI, the CRC may be checked, in case of successful checking, it is determined that it is a required PDCCH. In this situation, the UE may further read a content of the DCI in the PDCCH. If the bit N corresponding to the SC-MCCH change notification information in the DCI is 1, it may be indicated that the SC-MCCH will change in the next MP, and if N=0, it may be indicated that the SC-MCCH will not change.

At act 804, the UE may read changed SC-MCCH information.

The UE may immediately read the changed SC-MCCH information at the beginning of the next MP of the SC-MCCH according to the SC-MCCH time-domain location information indicated in the system broadcast message.

At act 805, the UE may receive a required service according to existing SC-MCCH information.

The UE may read SC-MTCH time-domain configuration information in the existing SC-MCCH information, and may further read required SC-MTCH data according to the time-domain configuration information.

First Embodiment

Figure 11:
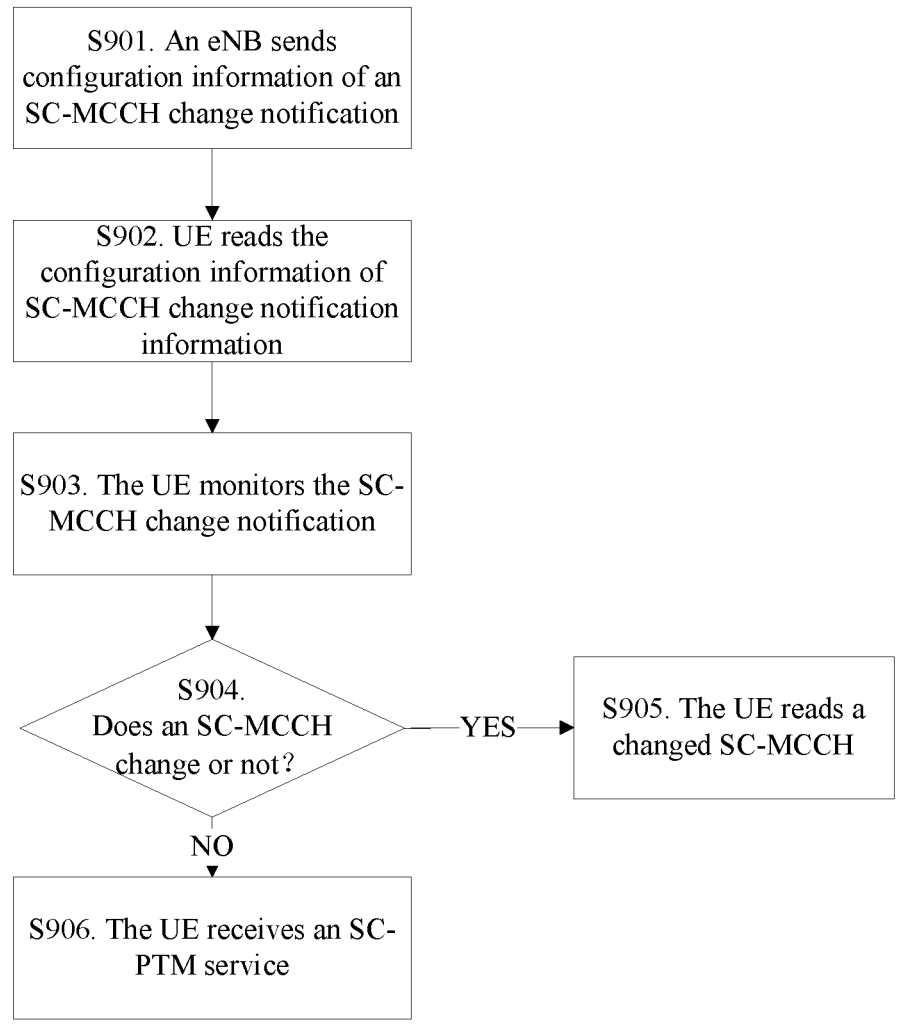
FIG. 11 is a flowchart of a first embodiment of the disclosure.

A scenario of the embodiment is that SC-MCCH change notification information is indicated by DCI. FIG. 11 is a flowchart of a first embodiment of the disclosure. As shown in FIG. 11, the example may include the following acts.

At act 901, a base station, e.g., an evolved Node B (eNB), may indicate configuration information of SC-MCCH change notification information through a system broadcast message.

The system broadcast message may be an existing MBMS system message, for example, an SIB13 or an SIB15. An SC-MCCH may be an MCCH corresponding to SC-PTM. The configuration information of the SC-MCCH change notification information may be time-domain location information of the SC-MCCH change notification information. A time-domain location may include: a frame period, a subframe location and a change notification repetition frequency in an MP of the SC-MCCH.

If DCI is adopted for indication, a specific RNTI, for example, SM-RNTI=FFFC, may be allocated to the SC-MCCH change notification information at first. Considering that the SC-MCCH is transmitted through a PDSCH and is scheduled through a PDCCH on a frequency domain, it is suggested to pre-allocate an RNTI, for example, SC-MCCH RNTI=FFFB, to the SC-MCCH, which may also be SM-RNTI=FFFB and SC-MCCH RNTI=FFFC. The time-domain location information for sending of the SC-MCCH change notification information may be indicated in the configuration information of the SC-MCCH change notification information on the system broadcast system. The time-domain location information may include: a time-domain frame period, a subframe location and a notification information repetition frequency in an MP of the SC-MCCH.

At act 902, UE may read the configuration information of the SC-MCCH change notification information.

The UE may read the configuration information of the SC-MCCH change notification information in the system broadcast message.

At act 903, the UE may monitor the SC-MCCH change notification information.

The UE may perform monitoring at the subframe location indicated by the system broadcast message. The monitoring may be implemented in the following manner. The UE may perform a mask operation by adopting an SM-RNTI and a CRC of a subframe, check the CRC, and in case of successful checking, determine that it is a required subframe. In this situation, the UE may further read a content of the DCI in the PDCCH of the subframe. The content of the DCI may be the SC-MCCH change notification information.

At act 904, the UE may determine whether the SC-MCCH changes or not, if YES, act 905 is executed, otherwise act 906 is executed.

Specifically, the SC-MCCH change notification information may be borne on the DCI in the PDCCH of the time-domain subframe. The DCI format-1c may be adopted. If the notification message indicates whether the SC-MCCH changes or not by adopting a bit N in the DCI, it may be indicated that the SC-MCCH will change in a next MP of the SC-MCCH if N=1, and it may be indicated that the SC-MCCH does not change if N=0.

At act 905, the UE may read changed SC-MCCH information.

The UE may immediately read the changed SC-MCCH information at the beginning of the next MP of the SC-MCCH according to the SC-MCCH time-domain location information indicated in the system broadcast message. Furthermore, the UE may read a required SC-MTCH content according to the changed SC-MCCH information.

At act 906, the UE may receive a required SC-MTCH service according to existing SC-MCCH information.

Second Embodiment

Figure 12:
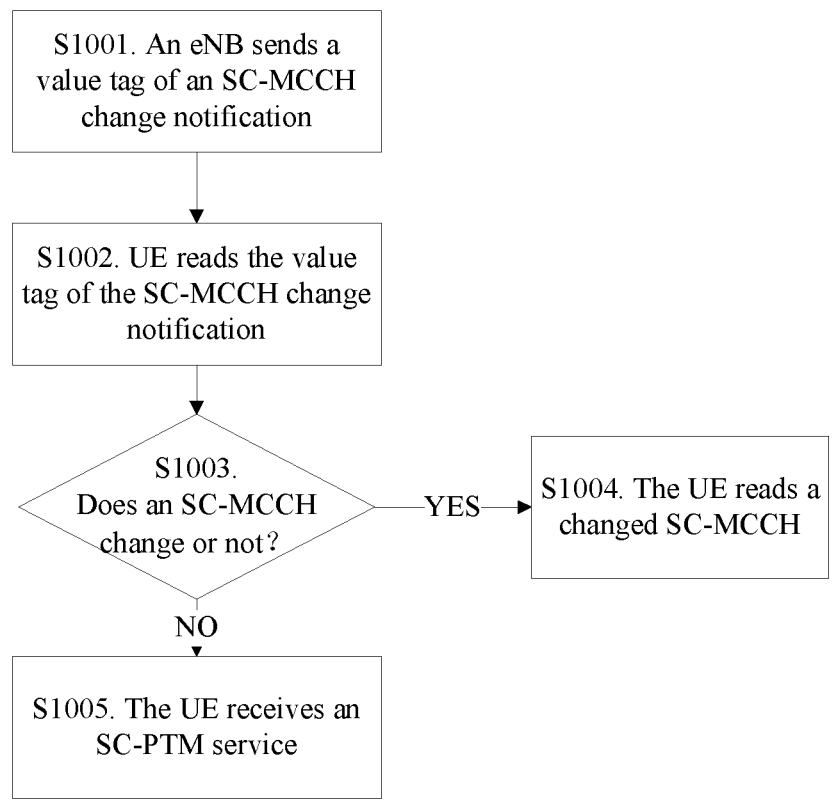
FIG. 12 is a flowchart of a second embodiment of the disclosure.

A scenario of the embodiment is that SC-MCCH change notification information is indicated by a value tag. FIG. 12 is a flowchart of a second embodiment of the disclosure. As shown in FIG. 12, the example may include the following acts.

At act 1001, a base station, e.g., an evolved Node B (eNB), may indicate configuration information of SC-MCCH change notification information through a system broadcast message.

The system broadcast message may be an existing MBMS system message, for example, an SIB13 or an SIB15. An SC-MCCH may be an MCCH corresponding to SC-PTM. The value tag may be an integer field sc-mcchValueTag set in the system broadcast message indicating a configuration of the SC-MCCH, a value of the field being (0 . . . 31), that is, the field may adopt all integer values between 0 and 31. Every time when the UE reads the configuration information of the SC-MCCH, the UE may store a value of the sc-mcchValueTag. If the UE finds that a value of sc-mcchValueTag in a current system broadcast message is different from the locally stored value of the sc-mcchValueTag, it may be indicated that the SC-MCCH changes, otherwise it may be indicated that the SC-MCCH does not change.

At act 1002, UE may receive SC-MCCH information and a value tag of the SC-MCCH change notification information.

According to an indication of the system broadcast message, the UE may receive the SC-MCCH information and store a numerical value of the value tag in the system broadcast message.

At act 1003, the UE may determine whether an SC-MCCH changes or not, if YES, act 1004 is executed, otherwise act 1005 is executed.

The UE may determine whether the SC-MCCH changes or not according to the locally stored numerical value and a value tag in a newly received system broadcast message, if the two are the same, it may be indicated that the SC-MCCH does not change, and if the two are not the same, it may be indicated that the SC-MCCH changes.

At act 1004, the UE may read changed SC-MCCH information.

The UE may immediately read the changed SC-MCCH information at the beginning of the next MP of the SC-MCCH according to SC-MCCH time-domain location information indicated in the system broadcast message. Furthermore, the UE may read a required SC-MTCH content according to the changed SC-MCCH information.

At act 1005, the UE may receive a required SC-MTCH service according to existing SC-MCCH information.

Third Embodiment

Figure 13:
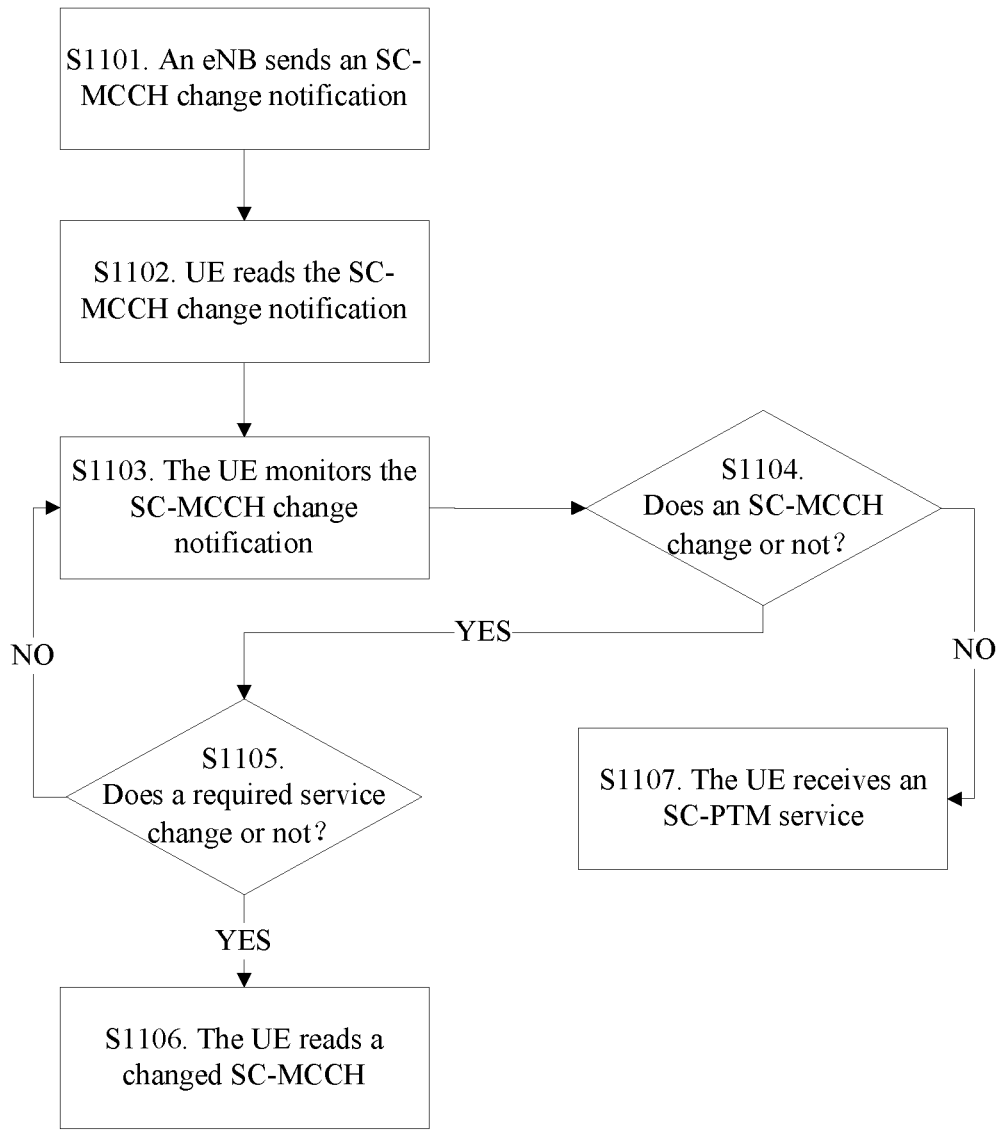
FIG. 13 is a flowchart of a third embodiment of the disclosure.

A scenario of the embodiment is that SC-MCCH change notification information includes service type information. FIG. 13 is a flowchart of a third embodiment of the disclosure. As shown in FIG. 13, the example may include the following acts.

At act 1101, a base station, e.g., an evolved Node B (eNB), may indicate configuration information of SC-MCCH change notification information through a system broadcast message.

The act is the same as act 901, and will not be elaborated herein.

At act 1102, UE may read the configuration information of an SC-MCCH change notification.

At act 1103, the UE may monitor the SC-MCCH change notification.

The act is the same as act 903, and will not be elaborated herein.

At act 1104, the UE may determine whether an SC-MCCH changes or not, if YES, act 1105 is executed, otherwise act 1107 is executed.

The act is the same as act 904, and will not be elaborated herein.

At act 1105, the UE may determine whether a required service changes or not, if YES, act 1106 is executed, otherwise act 1103 is executed.

SC-MCCH change notification information may indicate more service change related information by adopting two or more bits. That is, a service type may be indicated in DCI, and for example, two bits N are adopted for indication, wherein N1 may indicate whether the SC-MCCH changes or not, and N2 may indicate a changing service type, for example, N2=1 may indicate that a PS service changes, and N2=0 may indicate that an ordinary service changes. Furthermore, more than two bits in the DCI may be adopted to indicate more change information.

If the change notification is indicated through the two bits, the UE may determine the changing service type according to a value of N2. If the UE is only interested in a PS service, there is made such a hypothesis that N1=1, that is, the SC-MCCH changes. When N2=1, it is indicated that the PS service changes and the UE may read changed SC-MCCH information, and when N2=0, it is indicated that a non-PS service changes and the UE may not read changed SC-MCCH information.

At act 1106, the UE may receive changed SC-MCCH information.

The act is the same as act 905, and will not be elaborated herein.

At act 1107, the UE may receive a required SC-MTCH service according to existing SC-MCCH information.

Fourth Embodiment

Figure 14:
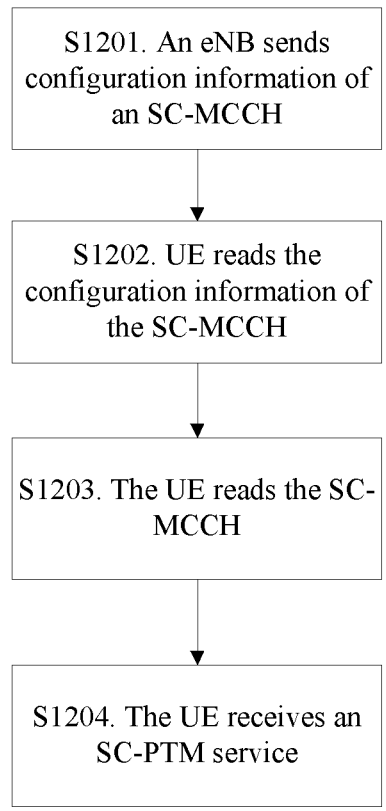
FIG. 14 is a flowchart of a fourth embodiment of the disclosure.

A scenario of the embodiment is that UE reads SC-MCCH information. FIG. 14 is a flowchart of a fourth embodiment of the disclosure. As shown in FIG. 14, the example may include the following acts.

At act 1201, a base station, e.g., an evolved Node B (eNB), may indicate configuration information of an SC-MCCH through a system broadcast message.

At act 1202, the UE may read the configuration information of the SC-MCCH.

At act 1203, the UE may read SC-MCCH information.

At act 1204, the UE may read SC-PTM service data.

Figure 15:
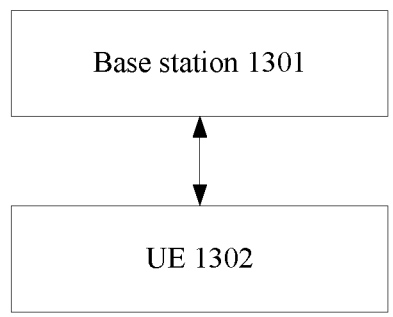
FIG. 15 is a schematic diagram of a configuration system for an SC-MCCH according to the disclosure.

FIG. 15 is a schematic diagram of a configuration system for an SC-MCCH according to the disclosure. The system may include a base station (e.g., an evolved Node B (eNB)) 1301 and UE 1302.

The base station 1301 may be configured to send a system broadcast message, an SC-MCCH message, SC-MCCH change notification information and SC-MTCH service data, and may be further configured to scramble CRCs of a subframe of the SC-MCCH change notification information and a subframe of an SC-MCCH by adopting an SM-RNTI and an SC-MCCH RNTI.

The UE 1302 may be configured to receive the system broadcast message, SC-MCCH message, SC-MCCH change notification information and SC-MTCH service data sent by the base station 1301, and may be further configured to detect the subframe of the SC-MCCH change notification information and the subframe of the SC-MCCH.

Figure 16:
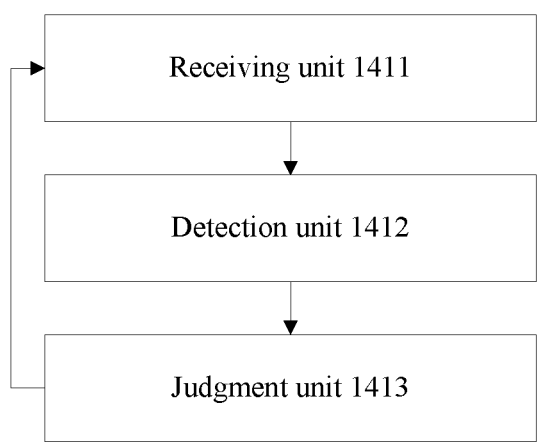
FIG. 16 is a schematic diagram of single-cell scheduling UE according to the disclosure.

FIG. 16 is a schematic diagram of single-cell scheduling UE according to the disclosure. The UE may include a receiving unit 1411, a detection unit 1412 and a judgment unit 1413.

The receiving unit 1411 may be configured to receive a system broadcast message, an SC-MCCH message, SC-MCCH change notification information and SC-MTCH service data.

The detection unit 1412 may be configured to detect a subframe of the SC-MCCH change notification information and a subframe of an SC-MCCH.

The judgment unit 1413 may be configured to judge whether the SC-MCCH changes or not.

An embodiment of the disclosure further provides a storage medium. Optionally, in the embodiment, the storage medium may be configured to store a program code configured to execute the following act.

At act S1, a base station may send a system broadcast message. The system broadcast message may contain configuration information of an SC-MCCH configured by the base station. The configuration information may include an MP of the SC-MCCH, time-domain location information of the SC-MCCH and an MCS of the SC-MCCH, and the configuration information may further include at least one of: an RP of the SC-MCCH, configuration information of SC-MCCH change notification information, and a value tag.

Optionally, in the embodiment, the storage medium may include, but not limited to: various media capable of storing program codes such as a U disk, a ROM, a RAM, a mobile hard disk, a magnetic disk or an optical disk.

Optionally, specific examples in the embodiment may refer to the examples described in the abovementioned embodiments and optional implementation modes, and will not be elaborated in the embodiment.

An embodiment of the disclosure further provides a storage medium. Optionally, in the embodiment, the storage medium may be configured to store a program code configured to execute the following act.

At act S2, UE may receive a system broadcast message sent by a base station. The system broadcast message may contain configuration information of an SC-MCCH configured by the base station. The configuration information may include an MP of the SC-MCCH, time-domain location information of the SC-MCCH and an MCS of the SC-MCCH, and the configuration information may further include at least one of: an RP of the SC-MCCH, configuration information of SC-MCCH change notification information, and a value tag.

Optionally, in the embodiment, the storage medium may include, but not limited to: various media capable of storing program codes such as a U disk, a ROM, a RAM, a mobile hard disk, a magnetic disk or an optical disk.

Optionally, specific examples in the embodiment may refer to the examples described in the abovementioned embodiments and optional implementation modes, and will not be elaborated in the embodiment.

Obviously, those skilled in the art should know that each module or each act of the disclosure may be implemented by a universal computing device. The modules or acts may be concentrated on a single computing device or distributed on a network formed by a plurality of computing devices. The modules or acts may optionally be implemented by program codes executable for the computing devices, so that the modules or acts may be stored in a storage device for execution with the computing devices. The shown or described acts may be executed in sequences different from those described here in some circumstances, or may form each integrated circuit module respectively, or multiple modules or acts therein may form a single integrated circuit module for implementation. Therefore, the disclosure is not limited to any specific hardware and software combination.

The above is only the exemplary embodiment of the disclosure and not intended to limit the disclosure. For those skilled in the art, the present disclosure may have various modifications and variations. Any modifications, equivalent replacements, improvements and the like made within the principle of the disclosure shall fall within the scope of protection defined by the appended claims of the disclosure.

INDUSTRIAL APPLICABILITY

The technical solutions of the embodiments of the disclosure may be applied to a resource configuration process for an SC-MCCH. The base station may send the system broadcast message containing the configuration information of the SC-MCCH configured by the base station, that is, the base station may configure the configuration information of the SC-MCCH in the system broadcast message. By virtue of the solution, a problem that there is no resource configuration method applicable to the SC-MCCH is solved, and resource configuration of the SC-MCCH is implemented.

What is claimed is:

1. A resource configuration method for a Single-Cell Multicast Control Channel (SC-MCCH), the method comprising:
    sending, by a base station, a system broadcast message, wherein the system broadcast message contains configuration information of an SC-MCCH, the configuration information comprises a Modification Period (MP) of the SC-MCCH and time-domain location information of the SC-MCCH, the time-domain location information of the SC-MCCH indicating locations of a radio frame and radio subframe where the SC-MCCH is located, and the configuration information further comprises at least one of: a Repetition Period (RP) of the SC-MCCH, configuration information of SC-MCCH change notification information, and a value tag;
    wherein, under a condition that the configuration information comprises the configuration information of the SC-MCCH change notification information, the SC-MCCH change notification information is indicated by Downlink Control Information (DCI) in a Physical Downlink Control Channel (PDCCH); and/or, under a condition that the configuration information comprises the value tag, the SC-MCCH change notification information is indicated by the value tag;
    wherein, under a condition that the SC-MCCH change notification information is indicated by the DCI, when the SC-MCCH change notification information only indicates whether the SC-MCCH changes or does not change, a first specified bit N in the DCI indicates whether the SC-MCCH changes or does not change, wherein a value of N is 1 or 0, and N being 1 indicates that the SC-MCCH changes while N being 0 indicates that the SC-MCCH does not change.

2. The method as claimed in claim 1, wherein
    the MP indicates a period of modification of the SC-MCCH;
    the RP indicates a period of repeated sending of the SC-MCCH in one MP; and
    the configuration information of the SC-MCCH change notification information indicates time-domain location information of the SC-MCCH change notification information, wherein the time-domain location information of the SC-MCCH change notification information comprises: locations of a radio frame and radio subframe where the SC-MCCH change notification information is located; and the value tag indicates the SC-MCCH change notification information.

3. The method as claimed in claim 1 wherein, under a condition that the SC-MCCH change notification information is indicated by the value tag, when a value of the value tag is different from a value of a value tag locally stored by User Equipment (UE), it is indicated that the SC-MCCH changes; and when the value of the value tag is the same as the value of the value tag locally stored by the UE, it is indicated that the SC-MCCH does not change.

4. The method as claimed in claim 1, wherein the SC-MCCH is identified by a first Radio Network Temporary Identifier (RNTI); and the SC-MCCH change notification information is identified by a second RNTI.

5. A resource configuration method for a Single-Cell Multicast Control Channel (SC-MCCH), the method comprising:
receiving, by User Equipment (UE), a system broadcast message sent by a base station, wherein the system broadcast message contains configuration information of an SC-MCCH, the configuration information comprises a Modification Period (MP) of the SC-MCCH and time-domain location information of the SC-MCCH, the time-domain location information of the SC-MCCH indicating locations of a radio frame and radio subframe where the SC-MCCH is located, and the configuration information further comprises at least one of: a Repetition Period (RP) of the SC-MCCH, configuration information of SC-MCCH change notification information, and a value tag;
wherein, after receiving, by the UE, the system broadcast message sent by the base station, further comprising: determining, by the UE, whether the SC-MCCH changes or does not change according to the configuration information; and under a condition that the SC-MCCH changes, reading, by the UE, changed SC-MCCH information;
wherein, under a condition that the SC-MCCH change notification information is indicated by the DCI, determining, by the UE, whether the SC-MCCH changes or does not change according to the configuration information comprises: reading, by the UE, the configuration information of the SC-MCCH change notification information in the configuration information; monitoring, by the UE, the SC-MCCH change notification information at a location, indicated by the configuration information of the SC-MCCH change notification information, of the subframe where the SC-MCCH is located; and determining, by the UE, whether the SC-MCCH changes or does not change according to the SC-MCCH change notification information, wherein determining, by the UE, whether the SC-MCCH changes or does not change according to the SC-MCCH change notification information comprises: acquiring, by the UE, a value of a first specified bit N in the DCI, under a condition that N is 1, determining, by the UE, that the SC-MCCH changes; and under a condition that N is 0, determining, by the UE, that the SC-MCCH does not change, wherein the value of N is 1 or 0.

6. The method as claimed in claim 5, wherein
the MP indicates a period of modification of the SC-MCCH;
the RP indicates a period of repeated sending of the SC-MCCH in one MP; and
the configuration information of the SC-MCCH change notification information indicates time-domain location information of the SC-MCCH change notification information, wherein the time-domain location information of the SC-MCCH change notification information comprises: locations of a radio frame and radio subframe where the SC-MCCH change notification information is located; and
the value tag indicates the SC-MCCH change notification information.

7. The method as claimed in claim 5, wherein, under a condition that the configuration information comprises the configuration information of the SC-MCCH change notification information, the SC-MCCH change notification information is indicated by Downlink Control Information (DCI) in a Physical Downlink Control Channel (PDCCH); and/or, under a condition that the configuration information comprises the value tag, the SC-MCCH change notification information is indicated by the value tag.

8. The method as claimed in claim 5, wherein, under a condition that the SC-MCCH change notification information is indicated by the value tag, determining, by the UE, whether the SC-MCCH changes or does not change according to the configuration information comprises:
comparing, by the UE, a value of the value tag and a value of a value tag locally stored by the UE;
under a condition that the value of the value tag is different from the value of the value tag locally stored by the UE, determining, by the UE, that the SC-MCCH changes; and
under a condition that the value of the value tag is the same as the value of the value tag locally stored by the UE, determining, by the UE, that the SC-MCCH does not change.

9. The method as claimed in claim 5, after determining, by the UE, whether the SC-MCCH changes or does not change according to the configuration information, further comprising:
determining, by the UE, whether a service of the SC-MCCH changes or does not change according to the DCI; and
under a condition that the service of the SC-MCCH changes, receiving, by the UE, changed SC-MCCH information.

10. The method as claimed in claim 9, wherein determining, by the UE, whether the service of the SC-MCCH changes or does not change according to the DCI comprises:
acquiring, by the UE, a value of a second specified bit M in the DCI; under a condition that M is 1, determining, by the UE, that a Public Security (PS) service of the SC-MCCH changes; and under a condition that M is 0, determining, by the UE, that an ordinary service of the SC-MCCH changes, wherein the value of M is 1 or 0.

11. The method as claimed in claim 5, wherein reading, by the UE, the changed SC-MCCH information comprises:
reading, by the UE, the changed SC-MCCH information at a start time of a next MP according to the time-domain location information of the SC-MCCH.

12. A resource configuration device for a Single-Cell Multicast Control Channel (SC-MCCH), applied to User Equipment (UE) and comprising:
a receiving module, configured to receive a system broadcast message sent by a base station, wherein the system broadcast message includes configuration information of the SC-MCCH, the configuration information comprises a Modification Period (MP) of the SC-MCCH and time-domain location information of the SC-MCCH, the time-domain location information of the SC-MCCH indicating locations of a radio frame and radio subframe where the SC-MCCH is located, and the configuration information further comprises at least one of: a Repetition Period (RP) of the SC-MCCH, configuration information of SC-MCCH change notification information, and a value tag;

further comprising:

a determination module, configured to determine whether the SC-MCCH changes or does not change according to the configuration information; and a reading module, configured to, under a condition that the SC-MCCH changes, read changed SC-MCCH information;

wherein, under a condition that the SC-MCCH change notification information is indicated by the DCI, the determination module is configured to determine whether the SC-MCCH changes or does not change according to the configuration information in a following manner: reading the configuration information of the SC-MCCH change notification information in the configuration information; monitoring the SC-MCCH change notification information at a location, indicated by the configuration information of the SC-MCCH change notification information, of the subframe where the SC-MCCH is located; and determining whether the SC-MCCH changes or does not change according to the SC-MCCH change notification information, wherein determining whether the SC-MCCH changes or does not change according to the SC-MCCH change notification information comprises: acquiring a value of a first specified bit N in the DCI, under a condition that N is 1, determining that the SC-MCCH changes; and under a condition that N is 0, determining that the SC-MCCH does not change, wherein the value of N is 1 or 0.

13. The method as claimed in claim 1, wherein, under a condition that the SC-MCCH change notification information is indicated by the DCI, when the SC-MCCH change notification information, besides indicating whether the SC-MCCH changes or does not change, further indicates a service type of the SC-MCCH, a first specified bit N in the DCI indicates whether the SC-MCCH changes or does not change, wherein a value of N is 1 or 0, and N being 1 indicates that the SC-MCCH changes while N being 0 indicates that the SC-MCCH does not change, and a second specified bit M in the DCI indicates a service type of the changed SC-MCCH, wherein a value of M is 1 or 0, and M being 1 indicates that a Public Security (PS) service changes while M being 0 indicates that an ordinary service changes.

14. The method as claimed in claim 5, wherein monitoring, by the UE, the SC-MCCH change notification information comprises:

performing, by the UE, a mask operation by adopting an SM-RNTI and a Cyclic Redundancy Check (CRC) of a subframe of an SC-MCCH change notification message, and checking the CRC, in case of successful checking, determining that the subframe is a required subframe, and reading a content of the DCI in the PDCCH of the subframe, wherein the content of the DCI is the SC-MCCH change notification information.

* * * * *